Patented Dec. 9, 1941

UNITED STATES PATENT OFFICE 2,265,184

BASIC ESTERS AND PROCESS OF PREPARING SAME

Karl Miescher, Riehen, and Karl Hoffmann, Basel, Switzerland, assignors, by mesne assignments, to Ciba Pharmaceutical Products, Incorporated, Summit, N. J., a corporation of New Jersey No Drawing. Application July 7, 1939, Serial No. 283,318. In Switzerland August 5, 1938

13 Claims. (Cl. 260—468)

This invention relates to the manufacture of basic esters by converting a di-alicyclic or aryl-alicyclic fatty acid or a reactive acid derivative thereof into a basic ester and if desired converting the basic ester into a quaternary salt.

The conversion of the acid or acid derivative into a basic ester is conducted according to known general methods. In this connection reference is made to Houben-Weyl, Die Methoden der Organischen Chemie, 3rd edition, vol. 2, (1925), page 640 et seq. For example, the di-alicyclic or aryl-alicyclic fatty acid or a reactive derivative thereof, such as an halide, ester, anhydride, ketene or the like, may be caused to react with an amino alcohol; or a reactive ester of an amino alcohol may be caused to act on one of the above acids or a salt thereof. Another procedure consists in converting the acid in manner itself known into, for example, a halogen-alkanol ester and causing this product to react with an amine.

Any di-alicyclic or aryl-alicyclic fatty acids and their acid derivatives may be used as parent materials. Reference may be made in this connection for example to Richter-Anschütz, Chemie der Kohlenstoffverbindungen, vol. 2, part I, (Leipzig, 1935). As examples of di-alicyclic or aryl-alicyclic fatty acids there may be named: dicyclohexyl fatty acids, phenyl-cyclohexyl fatty acids, phenyl-cyclohexenyl fatty acids, cyclohexyl-cyclopentyl fatty acids, dicyclopentyl fatty acids, and the like.

Open chain and cyclic amino alcohols, as well as their reactive derivatives, may be used for the reaction. There may particularly be mentioned amino alcohols substituted at the nitrogen, such as dialkylaminoalkanols, piperidinoalkanols, dialkylaminocyclohexanols, tropines and reactive esters of these amino alcohols, for example esters thereof with hydrohalic acids, arylsulfonic acids and the like. The reaction in accordance with the invention is advantageously conducted in the presence of a solvent. If required it may be conducted in the presence of a condensing agent.

The basic esters obtained in accordance with the invention may be converted in the usual manner into quaternary ammonium compounds by the attachment of alkyl halides, alkylene halides, aryl sulfonic acid esters, dialkyl sulfates or arylalkyl halides.

The hitherto known basic esters of fatty-aromatic carboxylic acids, for example atropine, scopolamine, diphenyl acetic acid diethyl-amino ethanol ester and others undergo a hydrolytic decomposition when their salts are kept in aqueous solution. Surprisingly it has been found that the new basic esters have a very considerably greater stability. Thus for example the sulfate of dicyclohexyl acetic acid-diethylamino ethanol ester and the hydrochloride of phenyl-cyclohexyl acetic acid-diethylamino ethanol ester can be sterilized for 10 hours without undergoing decomposition, whereas aqueous solutions of atropine sulfate and of diphenyl acetic acid diethyl-amino ethanol ester hydrochloride decompose already on standing for a long time even at ordinary temperature and considerably more rapidly when the solution is boiled. It is furthermore quite surprising that the new esters are also very active pharmacological substances. It could in no way be foreseen that the products of the invention would exhibit spasmolytic activity, since all hitherto known strong spasmolytically active basic esters belong to the fatty-aromatic series.

The following examples illustrate the invention the parts being by weight:

Example 1

22.4 parts of dicyclohexyl acetic acid are converted into the acid chloride in the usual manner by means of thionyl chloride and the acid chloride is caused to react with 12 parts of diethyl-amino ethanol. When the reaction is finished there are added to the reaction mass water, a solution of potassium carbonate and ether and the whole is vigorously shaken. The ethereal solution is washed with water, dried by means of potassium carbonate and evaporated. There is thus obtained dicyclohexyl acetic acid-2-diethylamino ethanol ester in the form of an oil of boiling point 154–157° C. under a pressure of 0.2 mm. This oil is dissolved in petroleum-ether and gaseous hydrogen chloride is passed over the solution, whereby the hydrochloride of the ester precipitates. It can be recrystallized from a mixture of alcohol and petroleum-ether. There is thus obtained dicyclohexyl acetic acid-diethyl-amino ethanol ester hydrochloride of melting point 168–169° C.

The dicyclohexyl acetic acid-diethylamino ethanol ester forms a sulfocyanide of melting point 93–95° C., a nitrate of melting point 102–104° C., a tartrate of melting point 63° C. with decomposition, a phosphate of melting point 112–114° C., a citrate of melting point 155–158° C. and an oxalate of melting point 120-124° C.

32 parts of dicyclohexyl acetic acid-diethyl-amino ethanol ester and 60 parts of allylbromide are heated in 500 parts of ethyl acetate for 3 hours to boiling, the whole is then cooled and filtered. The bromallylate so obtained, having a melting point 152–153° C., can be recrystallized from a mixture of ethylacetate and acetone. In a similar manner the following quaternary salts of dicyclohexyl acetic acid-diethylamino ethanol ester can also be prepared: bromomethylate, melting point 176–177.5° C.; bromethylate, melting point 178–180° C.; and bromobenzylate, melting point 155–156° C.

Example 2

218 parts of phenyl-cyclohexyl-acetic acid (melting point 149–150° C., obtainable for example by reaction of phenylacetonitrile and cyclohexyl-bromide in the presence of sodamide in solution in benzene and saponification of the resulting phenyl-cyclohexyl-acetonitrile with a mixture of sulfuric acid and hydrochloric acid), 135.5 parts of chlorethyldiethylamine and 200 parts of potassium carbonate are heated together for several hours in 800 parts of ethyl acetate, the whole is then filtered and gaseous hydrogen chloride is passed into the ethyl acetate solution. The hydrochloride of phenyl-cyclohexyl acetic acid-diethylaminoethanol ester thus formed is filtered with suction. It has the melting point 145–147° C. and is obtained in nearly quantitative yield.

In quite an analogous manner there may be prepared for example the diethylamino ethanol esters of phenyl-cyclohexyl-propionic acid and phenyl-cyclohexyl-butyric acid. The acids required as parent materials can be prepared for example by reduction of an ester of diphenyl-propionic acid or diphenyl-butyric acid with hydrogen in the presence of a nickel catalyst and saponification of the ester so obtained.

In an analogous manner there can also be obtained for example basic esters of dicyclopentyl-acetic acid, phenylcyclopentyl-acetic acid, phenylcyclohexenyl acetic acid and phenylcyclopentenyl acetic acid. The two last named acids may easily be obtained for example by reaction of phenylacetonitrile with cyclohexenylbromide or cyclopentenylbromide and saponification of the nitrile obtained. Phenyl-cyclopentyl-acetic acid can be obtained from phenyl-cyclopentenyl-acetic acid by the action of mild reducing agents.

Example 3

22 parts of phenyl-cyclohexyl-acetic acid, 17.5 parts of chlorethyl-diethylamine-hydrochloride and 35 parts of potassium carbonate are heated in 300 parts of ethyl acetate for 24 hours on a water bath. The reaction mixture is then filtered, the solution is evaporated and the residue is dissolved in ether. The ethereal solution is washed with water, dried by means of potassium carbonate and evaporated. By distillation of the residue phenyl-cyclohexyl-acetic acid-diethylamine ethanol ester of boiling point 158° C. under 0.15 mm. pressure is obtained in practically quantitative yield.

The same product can also be obtained for example by reaction of phenyl-cyclohexyl-acetic acid with chlorethyl-diethylamine in presence of an indifferent solvent, for example isopropyl alcohol.

10 parts of phenyl-cyclohexyl-acetic acid-diethylamino ethanol ester and 6 parts of methyl bromide in 40 parts of ethylacetate are allowed to stand first for several hours in the cold and then at room temperature. After some time the bromomethylate crystallises in beautiful crystals of melting point 174–179° C.

In similar manner there can be obtained for example the piperidino ethanol ester, the diethylaminobutanol ester, the diallylaminoethanol ester, the morpholino-ethanol ester, the ethyl-acetoxyethyl-amino ethanol ester, the ethyl-oxy-propylamino ethanol ester, the methyl-propyl-amino ethanol ester and the dimethylaminocyclohexanol-ester of phenylcyclohexyl-acetic acid, as well as quaternary salts of these compounds.

In analogous manner there may be prepared for example the dicyclohexyl-acetic acid-tropine ester which forms a hydrochloride of melting point 260–261° C. the α:α-dicyclohexyl-α-hydroxy-acetic acid-diethylamino ethanol ester hydrochloride of melting point 189–191° C. (α:α-dicyclohexyl-α-hydroxy-acetic acid of melting point 143–144° C. can be prepared for example by a catalytic reduction of benzilic acid), the α-phenyl-α-cyclohexyl-α-hydroxy-acetic acid-diethylamino ethanol ester forming a hydrochloride of melting point 212° C., the phenyl-cyclohexyl-acetic acid ester of ecgonine methyl ester, and the phenyl-dimethylaminocyclohexyl-acetic acid-diethylamino ethanol ester (the last named acid can be prepared for example by reaction of phenylacetonitrile with dimethylaminocyclohexyl bromide in the presence of sodamide, saponification of the nitrile).

What we claim is:

1. A process for the manufacture of basic esters, which comprises causing a member of the group consisting of di-alicyclic and aryl-alicyclic lower fatty acids and their reactive acid derivatives to react with a member of the group consisting of aminoalcohols and their hydrohalic and arylsulphonic esters.

2. A process for the manufacture of basic esters, which comprises causing phenyl-cyclohexyl-acetic acid to react with a member of the group consisting of aminoalcohols and their hydrohalic and arylsulphonic esters.

3. A process for the manufacture of basic esters, which comprises causing a reactive acid derivative of phenyl-cyclohexyl-acetic acid to react with a member of the group consisting of aminoalcohols and their hydrohalic and arylsulphonic esters.

4. A process for the manufacture of a basic ester, which comprises causing phenyl-cyclohexyl-acetic acid to react with an aminoalcohol.

5. A process for the manufacture of a basic ester, which comprises causing phenyl-cyclohexyl-acetic acid to react with diethylaminoethanol.

6. A process for the manufacture of a basic ester, which comprises causing a reactive acid derivative of phenyl-cyclohexyl-acetic acid to react with an aminoalcohol.

7. A process for the manufacture of a basic ester, which comprises causing phenyl-cyclohexyl-acetic acid to react with a hydrohalic ester of diethylaminoethanol.

8. The aminoalcohol esters of acids selected from the group consisting of the alicyclic and aryl-alicyclic substituted lower aliphatic carboxylic acids and the alicyclic and aryl-alicyclic substituted lower aliphatic monohydroxy-carboxylic acids.

9. The aminoalcohol esters of the alicyclic substituted lower fatty acids.

10. The aminoalcohol esters of the aryl-alicyclic substituted lower fatty acids.

11. The aminoalcohol esters of phenyl-cyclohexyl-acetic acid.

12. The phenyl-cyclohexyl-acetic acid diethylaminoethanol ester forming a hydrochloride of melting point 145–147° C.

13. The α-phenyl-α-cyclohexyl-α-hydroxy-acetic-acid-diethylamino ethanol ester.

KARL MIESCHER.
KARL HOFFMANN.